Patented May 27, 1947

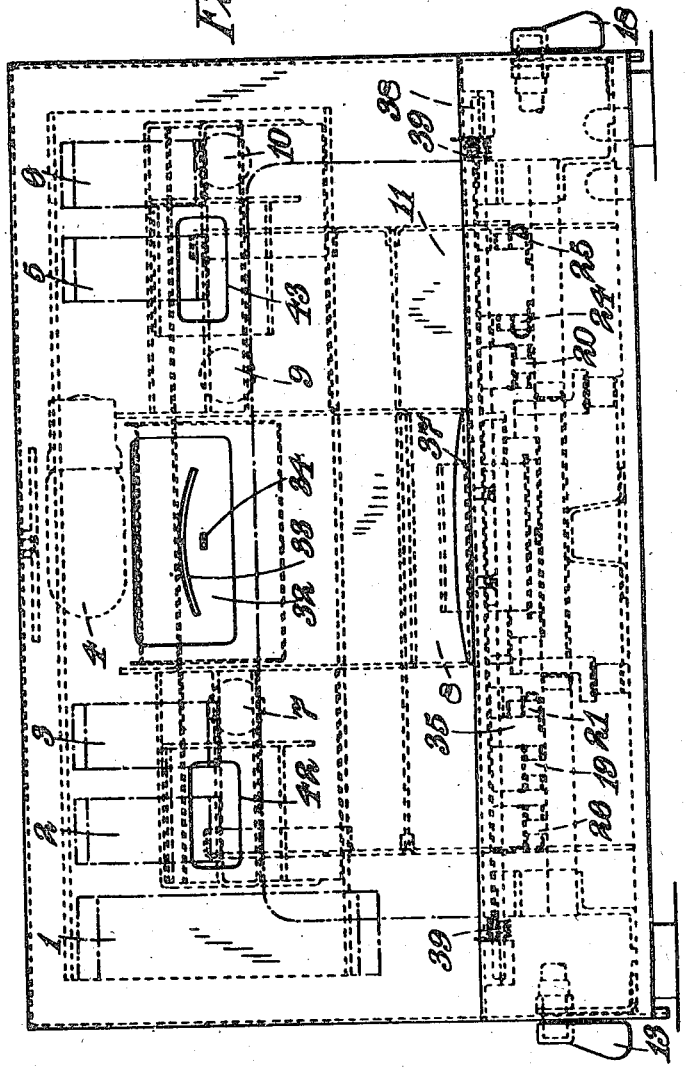

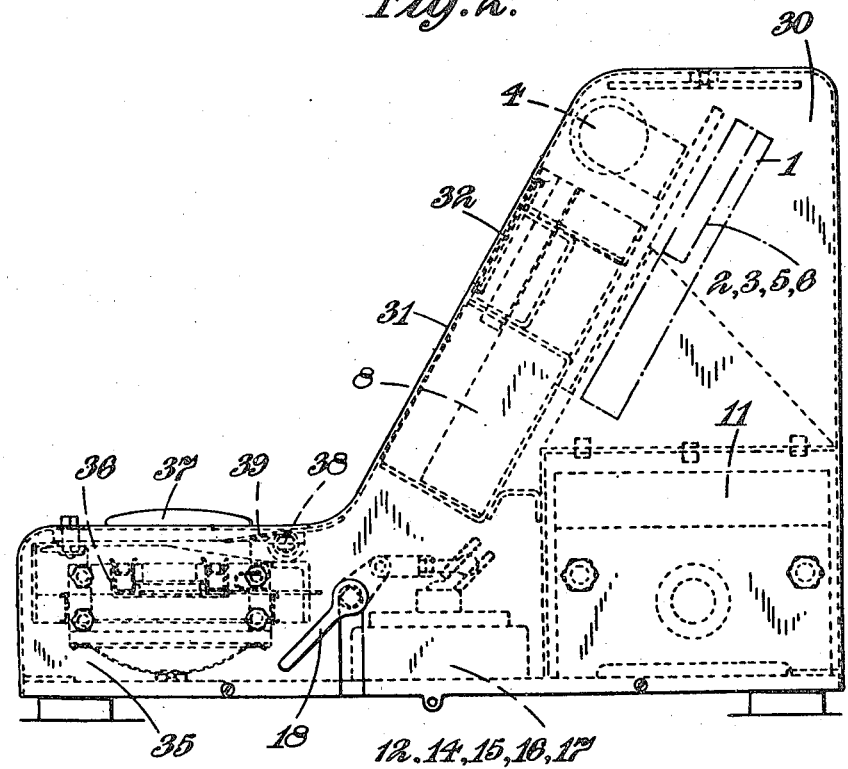

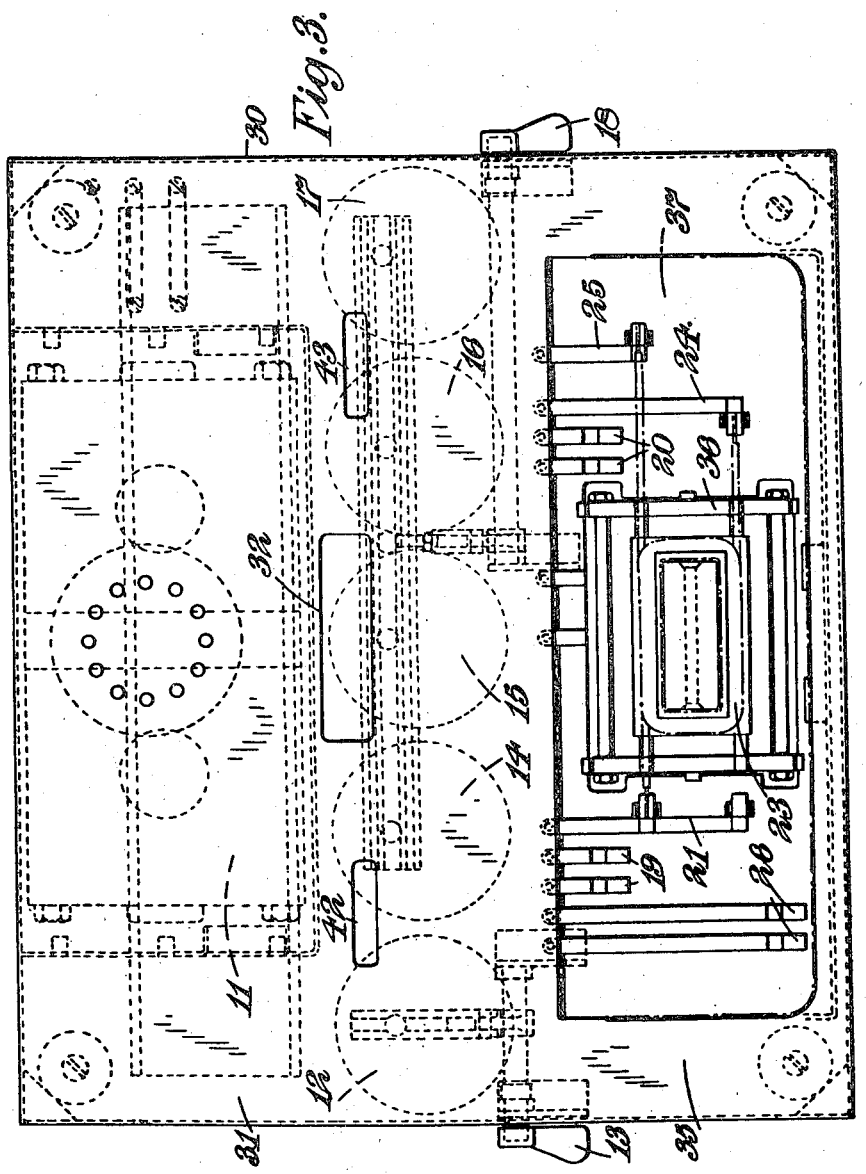

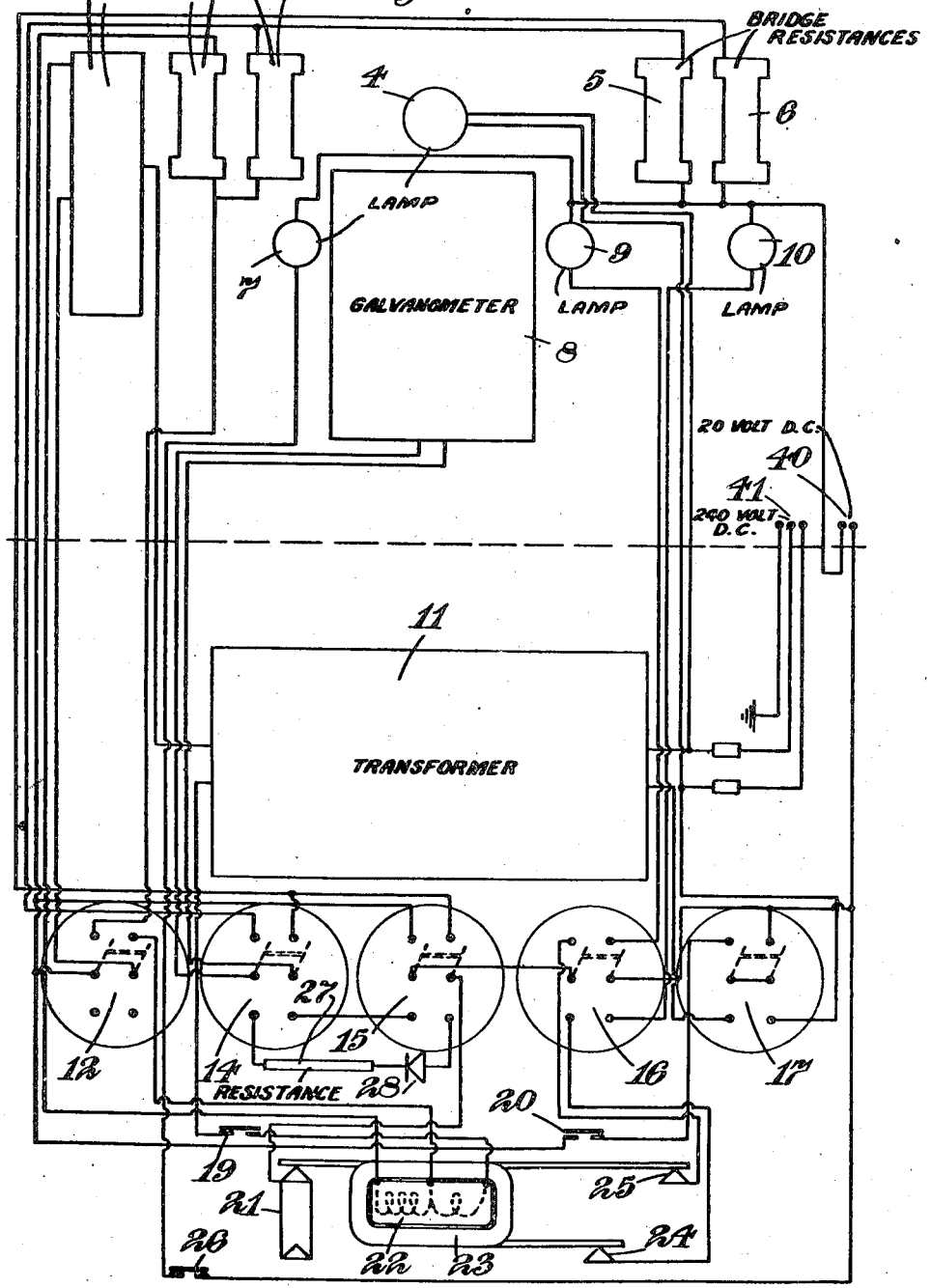

2,421,227

UNITED STATES PATENT OFFICE 2,421,227

APPARATUS FOR TESTING ELECTRIC COILS

Frederick James Watson, Old Windsor, and Felix Moutran, Slough, England, assignors to Self-Priming Pump & Engineering Co. Limited, London, England, a British company Application June 17, 1943, Serial No. 491,188
In Great Britain May 6, 1942

2 Claims. (Cl. 175—183)

This application corresponds to the application of Self-Priming Pump & Engineering Co. Limited, Frederick James Watson and Felix Moutran, Serial No. 6106/42, which was filed in Great Britain on May 6, 1942.

This invention consists of improvements in or relating to apparatus for testing electric coils and particularly it relates to a device for checking the resistance and the number of turns in electric coils like the field coils of a dynamo electric machine.

In normal times the measurement of the resistance of a coil (such as a field coil) can be carried out on a Wheatstone bridge type of apparatus with great exactitude. Electric inductance measurements in coils can likewise be carried out with accuracy but in turning out small electric motors or dynamos or coils for such machines on a system of mass production, it has become necessary to provide a rapid check on the resistance of a coil and on the number of turns in the coil simply to ensure that the coil in question comes up to the prescribed standard in both these respects and the work may have to be done by unskilled labour.

According to this invention the apparatus is a unitary structure comprising a mounting for the coil to be tested, a Wheatstone bridge or equivalent device for checking the ohmic resistance of the coil by including it as a branch of the bridge, means for checking the number of turns in the coil by an A. C. circuit including a transformer whereof the secondary may be constituted wholly or in part by the coil under test and includes in circuit a current-indicating instrument, and means for selectively coupling the coil under test in the Wheatstone bridge circuit or in the secondary circuit of the transformer.

According to a feature of the invention both the resistance and turns tests may be carried out using the same galvanometer or equivalent current-indicating instrument, means being provided for coupling the galvanometer selectively either in the Wheatstone bridge system or through a rectifier in the secondary coil circuit of the transformer. The galvanometer may have a screen mounted in front of a pointer and formed with two slots through which different portions in the length of the pointer may be observed, the two slots being appropriate respectively to the resistance and turns tests and the location and length of each slot being such that its opposite ends define prescribed plus and minus variations from a standard.

According to a further feature of the invention the apparatus may embody, for each of the two tests (resistance and number of turns) two circuits appropriate to the testing of coils of two different voltage standards, say 12-volts and 24-volts, and switch means for selectively determining which voltage circuits shall be operated.

The unitary structure may comprise a box for housing the various parts of the testing equipment, an electromagnetic core frame for receiving the coil under test being accommodated in a portion of the box provided with an opening (for insertion of the coil) furnished with a hinged cover-plate, and switches automatically controlled by the cover-plate being provided for closing the testing circuits. The necessary contacts for connecting the windings of the coil under test with the testing circuits may also be controlled by the closing of the cover-plate. Preferably the testing circuits include coloured lights to indicate which of the two tests is in progress.

One apparatus embodying the foregoing and other features of the invention will now be described with reference to the accompanying drawings, in which—

Figures 1, 2 and 3 show the apparatus in front elevation, side elevation and plan respectively, and Figure 4 is a wiring diagram.

The apparatus is designed to test motor field coils for both 12- and 24-volt units, the test in each case being carried out in two stages, firstly the test of the ohmic resistance of the coil and secondly the check on the number of turns in the coil.

The general layout of the apparatus (the circuit control of which will later be described) is as follows. The various parts of the testing equipment are accommodated in a box 30 having a sloping front wall 31, behind the upper part of which resistance units 5, 6 and a double resistance unit 2, 3 constituting three branches of a Wheatstone bridge are mounted. The Wheatstone bridge is energised from a 24-volt D. C. supply 40. A galvanometer 8 is mounted behind the sloping front wall 31 below the resistance and is adapted (in a manner presently to be described) to be included selectively either in the resistance test or in the turns test. The pointer of the galvanometer is movable behind an observation plate 32 (Figure 1) in which two inspection slots 33, 34 appropriate respectively to the "resistance" and "number of turns" tests, are provided. The lower end of the sloping wall 31 of the box leads to a front horizontal compartment 35 (Figure 2) in which is located the socket, in the form of an electromagnetic core frame 36, to receive the coil 23 to be tested. A single-phase transformer 11 is mounted at the back of the box on the base thereof. The primary of the transformer 11 is supplied from a 240-volt A. C. source 41, and the secondary of this transformer is connected through a resistance 1 (mounted behind the front wall 31 of the instrument box alongside the bridge resistances 2, 3, 5, 6) to a coil 22 in the core of the receiving unit 36. The front compartment 35 is furnished with a hinged coverplate 37 pivotally mounted on a spindle 38 and urged by springs 39 towards the closure position. The cover-plate 37 controls contacts 21, 24, 25 for the field coil under test, the contacts 21, 25 taking in both shunt and series windings of the coil and contacts 21, 24 taking in the shunt winding only. The cover-plate 37 also controls automatic switches 19, 20, 26 for the various test circuits. The switches 19, 20 are included respectively in the turns and resistance test circuits. The switch 26 operates a green lamp 7 off the 24-D. C. supply 40. The illumination of the lamp 7 is visible through an observation slot 42 in the front wall 31 of the instrument box and is designed to show that the cover-plate 37 is well pressed home before any readings are made.

Manually operable switches 12, 14, 15, 16, 17 are mounted in the box 30 between the electromagnetic core frame 36 and the transformer 11. The switch 12 is operable by an external knob 13 and determines the selection of the appropriate circuits for the testing of 12-volt or, alternatively, 24-volt field coils. The switches 14, 15, 16 and 17, which are simultaneously operable by an external knob 18, control the selection of various circuits appropriate respectively to the resistance and number of turns tests.

A white lamp 9 and a blue lamp 10, operated off the 24-volt D. C. supply, are arranged to indicate, through an observation window 43 in the front wall 31 of the instrument box, whether the resistance or number of turns test is in progress. A lamp 4 operated off the 240-A. C. supply provides the necessary illumination at the slots 33, 34 in the galvanometer dial plate 32.

As already indicated, the apparatus in the present example is designed to test motor field coils for 12- and 24-volt units. The normal total value of resistance of one such field coil (shunt and series windings) if 9.70 ohms for the 12-volt unit and 30.77 ohms for the 24-volt unit. In carrying out the resistance test the field coil 23 to be tested is arranged to constitute one of the four branches of the Wheatstone bridge, the remaining three branches being constituted by the resistances 5, 6 each of 120.8 ohms, and the double unit resistance 2, 3, the unit 2 having a resistance of 21.07 ohms and the unit 3 a resistance of 9.7 ohms. The arrangement (which will later be described in more detail) is such that when a 12-volt coil is being tested the unit 2 of 21.07 ohms is short-circuited leaving in circuit only the unit 3 of 9.7 ohms resistance, and when a 24-volt field coil is under test both units 2, 3 are in circuit giving a total resistance of 21.07+9.7 ohms, i. e. 30.77 ohms.

It will be appreciated that if during the resistance test, the field coil under test (12- or 24-volt) has one of the values indicated above (9.7 ohms or 30.77 ohms) the galvanometer pointer will be at zero. Assuming that the maximum and minimum variation from these values is ±5%, the limit values will be for a 12-volt coil 10.185 ohms and 9.215 ohms and for a 24-volt coil 32.309 ohms and 29.232 ohms. The galvanometer is so arranged that its zero reading corresponds to the mid-position in the length of the arcuate slot 33 in the dial plate 32 and the length of the slot is such that its ends correspond to the limit values indicated above. Thus if on test the pointer is beyond the slot, either to the left or right, this indicates that the ohmic resistance of the field coil under test is higher or lower than the specified ±5% and should be rejected.

In the present example the primary coil 22 in the electromagnetic core comprises forty turns of 23 S. W. G. and the arrangement is such that when the number of turns of the secondary 23 constituted by the coil under test are correct—in the present case 180 turns for the 12-volt coil and 300 turns for the 24-volt coil—the pointer of the galvanometer will show at the mid-position of the lower slot 34 in the dial plate 32. The length of the slot 34 is such that its ends define positions corresponding to variations of ±5% turns above or below the correct values. Thus if the number of turns of a coil under test is over ±5% or under −5% the pointer will disappear to the left or to the right respectively of the slot 34 and the coil under test should then be rejected.

The operation of the switches 12 and 14 to 17 will now be described with reference to the wiring diagram (Figure 4).

In the upper position of the switch 12 the left-hand blade of the switch short-circuits the 21.07 ohm resistance unit 2, putting in circuit the 9.7 ohm resistance unit 3 corresponding to the 12-volt field coil. In the lower position of the left-hand blade of the switch 12 the 21.07 ohm resistance unit 2 is included in the circuit and the total resistance becomes 30.77 ohms corresponding to the 24-volt test requirement. The right-hand blade of the switch 12 is utilised for selecting the appropriate circuit in the number of turns test corresponding to a 12-volt or, alternatively, 24-volt field coil. In its upper position the right-hand blade of the switch 12 short-circuits a portion of the primary coil 22 and of the resistance 1 included in the primary coil circuit. In the lower position of the right-hand blade of the switch 12 the whole of the primary coil 22 and of the resistance 1 is included in the testing circuit.

The switch 14 is arranged to control the galvanometer circuit appropriate to the resistance and turns tests respectively. In its upper position the galvanometer 8 is connected to the Wheatstone bridge (resistance test) and in its lower position is connected in series with a resistance 27 and a rectifier 28 (turns test). The purpose of the rectifier 28 is to make use of the same galvanometer on A. C. circuit.

The switch 15 is arranged to operate similarly to switch 14, the upper position of the switch blades being appropriate to the resistance test and the lower position appropriate to the turns test.

Similarly, the switch 16 in its upper and lower positions gives appropriate connections for the resistance and turns tests respectively. The left-hand blade, in its upper position, takes in the whole field coil under test (shunt and series windings) across the coil contacts 21, 25, while in its lower position connects, across the coil contacts 21, 24, the shunt winding only in circuit for the turns test. The right-hand blade of the switch 16 in its upper position takes into circuit the white lamp 9 showing that the resistance test is in progress, and in its lower position the right-hand blade takes into circuit the blue lamp 10 indicating that the turns test is in progress.

The switch 17 in its upper position connects the 24-volt D. C. supply to the Wheatstone bridge and in its lower position connects the 240-volt A. C. supply to the primary of the single-phase transformer 11.

In making a test, the coil to be tested is first inserted in the core frame 36 and the lid 37 of the front compartment 35 is securely closed down. As already indicated, the closing of the lid automatically establishes the coil contacts 21, 24 and 25 and also the circuit contacts 19, 20 and 26. The operator then turns the knob 13, controlling the dual voltage range switch 12, in a direction appropriate to the voltage of the coil to be tested. The operator then turns the knob 18 in a direction appropriate to the resistance test, all the switches 14, 15, 16 and 17 being simultaneously thrown into positions appropriate to the resistance test circuits. After the galvanometer reading has been taken the knob 18 is turned in the opposite direction and the switches 14 to 17 are thereby thrown simultaneously into positions appropriate to the circuits of the turns test and the galvanometer reading is again taken.

We claim:

1. Apparatus for testing electrical coils as to ohmic resistance and number of turns in the coil, said apparatus comprising a unitary structure which includes, in combination, a single current-indicating instrument, a mounting for receiving the coil under test including contacts for the winding terminals thereof, a Wheatstone bridge supplied by a D. C. circuit, a transformer primary associated with said mounting and supplied by an A. C. circuit, switching means for electrically connecting said contacts for the coil under test selectively either as a branch of the Wheatstone bridge or as part at least of the secondary of a transformer, the said primary of which is associated with the mounting, a rectifier, switch means for electrically connecting said instrument selectively either in the Wheatstone bridge system, or through said rectifier, in the secondary circuit of said transformer whereby there is provided a unitary device combining resistance and reactance tests for test coils, the single current-indicating instrument being provided with a pointer, a cover for said instrument and pointer, two slots formed in said cover through which two different portions of the length of the pointer may be observed during certain portions of its movement, the slots being appropriate respectively to the reading of indications of the resistance and number of turns tests, and the location and lengths of each slot being such that its opposite ends define prescribed plus and minus variations from a standard.

2. Apparatus for testing electrical coils as to ohmic resistance and number of turns in the coil, said apparatus comprising a unitary structure which includes, in combination, a single current-indicating instrument, a mounting for receiving the coil under test including contacts for the winding terminals thereof, a Wheatstone bridge supplied by a D. C. circuit, a transformer primary associated with said mounting and supplied by an A. C. circuit, switching means for electrically connecting said contacts for the coil under test selectively either as a branch of the Wheatstone bridge or as part at least of the secondary of a transformer, the said primary of which is associated with the mounting, a rectifier, switch means for electrically connecting said instrument selectively either in the Wheatstone bridge system, or through said rectifier; in the secondary circuit of said transformer whereby there is provided a unitary device combining resistance and reactance tests for test coils, the single current-indicating instrument being provided with a pointer, a cover for said instrument and pointer, two slots formed in said cover through which two different portions of the length of the pointer may be observed during certain portions of its movement, the slots being appropiate respectively to the reading of indications of the resistance and number of turns tests, and the location and lengths of each slot being such that its opposite ends define prescribed plus and minus variations from a standard, and differently colored lights being disposed in the two respective circuits to indicate which of the two tests the circuits are connected for, and consequently to indicate to the operator through which slot to observe the pointer.

FREDERICK JAMES WATSON.
FELIX MOUTRAN.

REFERENCES CITED

The following references are of record in the file of this patent:

UNITED STATES PATENTS

| Number | Name | Date |
|---|---|---|
| 684,541 | Conant | Oct. 15, 1901 |
| 1,743,318 | Carrington | Jan. 14, 1930 |
| 2,153,990 | Paulson | Apr. 11, 1939 |
| 2,304,513 | Stearns | Dec. 8, 1942 |
| 1,629,680 | Cooke | May 24, 1927 |
| 1,753,043 | Butler | Apr. 1, 1930 |
| 1,942,157 | Wickson | Jan. 2, 1934 |
| 2,364,687 | Banker | Dec. 12, 1944 |
| 2,295,301 | Smith | Sept. 8, 1942 |
| 1,479,284 | Cullin | Jan. 1, 1924 |
| 1,561,483 | Pickard | Nov. 17, 1925 |
| 1,959,592 | Macadie | May 22, 1934 |
| 2,116,119 | Lowenstein | May 3, 1938 |